United States Patent [19]
Stieb

[11] Patent Number: 5,733,614
[45] Date of Patent: Mar. 31, 1998

[54] ARRANGEMENT FOR TIGHTLY ENCLOSING A SUBSTRATE

[75] Inventor: Werner Stieb, Stadthagen, Germany

[73] Assignee: Alcatel Kabel AG & Co., Germany

[21] Appl. No.: 702,337

[22] Filed: Aug. 23, 1996

[30] Foreign Application Priority Data

Sep. 21, 1995 [DE] Germany ............ 295 15 112 U

[51] Int. Cl.$^6$ .................................................. H02G 15/18
[52] U.S. Cl. ............... 428/34.9; 428/35.1; 428/192; 428/913; 174/DIG. 8; 138/99; 138/103; 138/110; 138/128; 138/163; 138/167; 138/168; 24/336
[58] Field of Search .................. 428/34.9, 35.1, 428/913, 192, 68; 174/DIG. 8; 138/128, 110, 103, 99, 168, 167, 163; 24/336

[56] References Cited

U.S. PATENT DOCUMENTS

| | | |
|---|---|---|
| 3,847,721 | 11/1974 | Evans .................. 174/DIG. 8 |
| 4,219,051 | 8/1980 | D'Haeyer .................. 138/110 |
| 4,283,239 | 8/1981 | Corke et al. .................. 174/DIG. 8 |
| 4,689,474 | 8/1987 | Overbergh et al. .................. 174/DIG. 8 |
| 4,860,799 | 8/1989 | Van Noten .................. 138/167 |
| 4,900,596 | 2/1990 | Peacock .................. 174/DIG. 8 |
| 4,952,437 | 8/1990 | Winterhoff et al. .................. 428/34.9 |
| 4,954,213 | 9/1990 | Jos et al. .................. 428/35.1 |

*Primary Examiner*—Rena Dye

[57] ABSTRACT

An arrangement for tightly enclosing a substrate with a heat-shrinking plastic sleeve (1), which has thickened sections (2, 3) along its longitudinal edges, has at least two rails (4, 5) pushed on the sleeve (1) after it has been placed around the substrate. The rails hold the longitudinal edges of the sleeve (1) together before, during and after the heat-shrinking. The two rails (4, 5) form a junction area and S-shaped profiles (6, 7) are placed in the junction area on both sides of the thickened edge sections (2, 3) and are enclosed by both of the rails (4, 5).

12 Claims, 1 Drawing Sheet

ARRANGEMENT FOR TIGHTLY ENCLOSING A SUBSTRATE

BACKGROUND OF THE INVENTION

1. Technical Field

The invention concerns an arrangement for tightly enclosing a substrate with a sleeve made of heat-shrinking plastic, which has thickened sections along its longitudinal edges, over which a rail is pushed after the sleeve has been placed around the substrate, which rail holds the longitudinal edges of the sleeve together before, during and after the heat-shrinking.

2. Description of the Prior Art

To cover cable splices, tube connections and the like, it is known to use heat-shrinkable sleeves. The sleeves have beads on their longitudinal edges over which an essentially C-shaped metal rail is pushed after the sleeve has been placed around the substrate to be enclosed. The open gap of the C-shaped rail is designed so that the thickened edge areas cannot pull out of the rail during the heat-shrinking. In this way, it is possible to produce a tube-shaped jacket from a strip.

Pushing a rail over very long sleeves creates considerable problems because of the high friction forces, particularly because the rail can also bend during the transportation and during the pushing as well.

It was therefore proposed to push two rails over the beads from opposite ends of the sleeve. However, this can lead to problems in the junction areas of the rails during heat-shrinking.

It is known from U.S. Pat. No. 4,860,799 to first place a clamp over the thickened edge area, approximately in the center of the sleeve. The clamp is either pushed over the beads from one end of the sleeve, or it is clipped over the beads from above. The rails are then pushed over the beads from both ends, and arranged with respect to the clamp, so that the separation area between the rails is bridged by the clamp. Difficulties can arise when the rails are pushed over the clamp, since the rails must closely grip the edge beads on the one hand, and the clamp increases the cross section of the edge beads on the other.

SUMMARY OF THE INVENTION

An object of the present invention is to improve the known arrangement, so that the difficulties during the pushing on are avoided, the installation of a bridging part in the junction areas of the rails is simplified, and to make the arrangement more cost-effective altogether.

The present invention provides two S-shaped profiles which considerably simplify the handling of the arrangement. The profiles can be placed against the edge beads and held in place with the fingers. Then one of the rails is pushed over the ends of the profiles. Finally, the second rail is pushed on until it abuts against the first rail. The rails affix the profiles between themselves and the edge beads.

Another possibility of installation is to first arrange a rail in its final position and push about half of the profiles between the edge beads and the rail. The second rail is then pushed over the edge beads and the profiles. The profiles can be cost-effectively produced as so-called rolled profiles.

The invention will be fully understood when reference is made to the following detailed description taken in conjunction with the accompanying drawing.

DETAILED DESCRIPTION OF THE INVENTION

Figure 2:
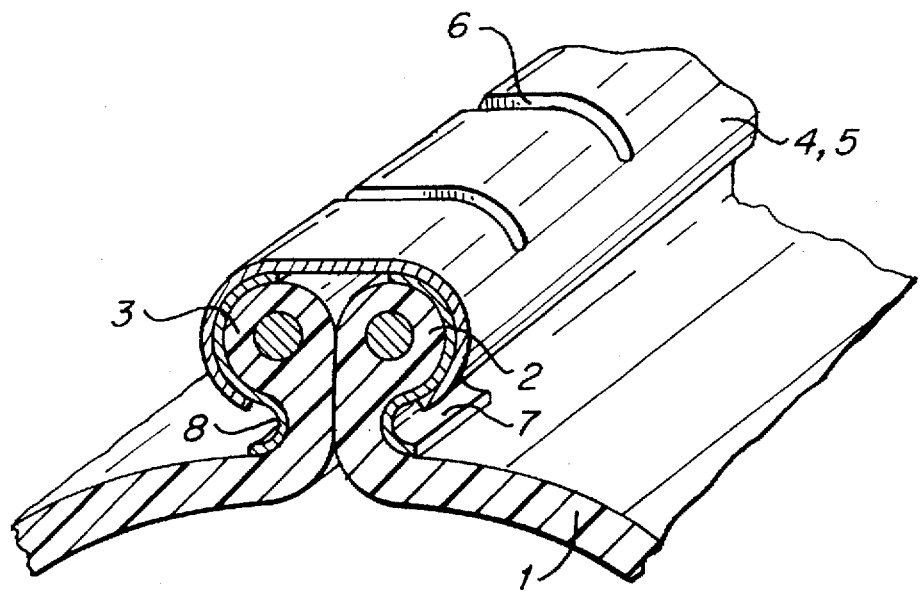
FIG. 2 is a side view of a section of the arrangement for enclosing a substrate.
Figure 1:
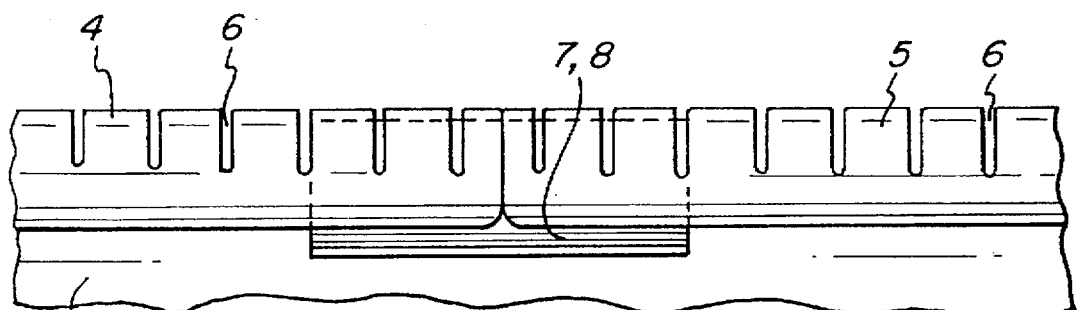
FIG. 1 is a cross-sectional perspective view of an arrangement for enclosing a substrate.

As seen in FIGS. 1 and 2, a sleeve 1 made of a heat-shrinkable plastic has thickened edge areas 2 and 3, over which a rail 4 and 5 is pushed from each end of the sleeve 1. The rails 4 and 5 contain slots 6 to ensure better flexibility of the rails 4 and 5. Two S-shaped profiles 7 and 8 are provided under the rails 4 and 5 in the junction area of rails 4 and 5, which extend on both sides of the junction area and therefore bridge the junction areas of the rails 4 and 5. The profiles 7 and 8 are made of stainless steel and are adapted to the contour of the sleeve 1 in the area of the longitudinal edges.

It can be clearly seen that the profiles 7 and 8 closely adjoin the sleeve 1, while an area of profiles 7 or 8 grips the edge bead 2 or 3, and another area of profiles 7 or 8 adjoins the outer surface of sleeve 1. The edge area of profiles 7 or 8 is bent outward, to prevent damage to the sleeve 1 during the heat-shrinking.

Figure 3:
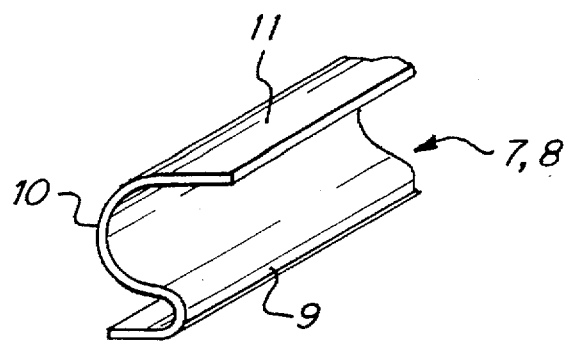
FIG. 3 is a perspective view of a profile of the present invention.

Referring to FIG. 3, each profile 7 or 8 has a first area 9, which has a smaller bending radius than the second area 10 and is bent in an opposite direction. The bending radii of areas 9 and 10 are designed to approximate the bending radii of the corresponding areas of rails 4 or 5. Each profile 7 or 8 has a straight area 11 which adjoins the second bend area 10. The profiles 7 or 8 are produced by roller deformation of a strip material. The process starts with a stainless steel strip that is about 0.2 mm thick. Lengths of about 50 mm are cut off after the roller deformation.

The preferred embodiment described above admirably achieves the objects of the invention. However, it will be appreciated that departures can be made by those skilled in the art without departing from the spirit and scope of the invention which is limited only by the following claims.

What is claimed is:

1. In an arrangement for tightly enclosing a substrate with a heat-shrinkable plastic sleeve, which has thickened sections along its longitudinal edges, over which a pair of rails are pushed after the sleeve has been placed around the substrate to hold the longitudinal edges of the sleeve together before, during and after heat-shrinking, the rails form a junction area, the improvement comprising: S-shaped profiles positioned in the junction area on both sides of the thickened sections and held in place by the rails.

2. An arrangement as claimed in claim 1, wherein each S-shaped profile has a first area with a small bending radius and a second area with a larger bending radius which is bent in an opposite direction.

3. An arrangement as claimed in claim 2, wherein the second area adjoins the thickened section before, during and after the heat-shrinking.

4. An arrangement as claimed in claim 2, wherein each of the rails has a bending radius and the bending radius of the second area is substantially equal to the bending radius of each of the rails, which adjoin the second area.

5. An arrangement as claimed in claim 2, wherein a straight area adjoins the second area of each of the S-shaped profiles.

6. An arrangement as claimed in claim 1, wherein the S-shaped profiles are made of stainless steel.

7. An arrangement for tightly enclosing a substrate, which comprises:

(a) a heat-shrinkable plastic sleeve having thickened sections along its longitudinal edges;

(b) a pair of rails positioned over the thickened edge section of the heat-shrinkable plastic sleeve after the heat-shrinkable plastic sleeve has been placed around the substrate to hold the longitudinal edges of the heat-shrinkable plastic sleeve together before, during and after heat-shrinking, the rails form a junction area therebetween; and (c) S-shaped profiles positioned in the junction area on both sides of the thickened sections and held in place by the rails.

8. An arrangement as claimed in claim 7, wherein each S-shaped profile has a first area with a small bending radius and a second area with a larger bending radius which is bent in an opposite direction.

9. An arrangement as claimed in claim 8, wherein the second area adjoins the thickened section before, during and after the heat-shrinking.

10. An arrangement as claimed in claim 8, wherein each of the rails has a bending radius and the bending radius of the second area is substantially equal to the bending radius of each of the rails, which adjoin the second area.

11. An arrangement as claimed in claim 8, wherein a straight area adjoins the second area of each of the S-shaped profiles.

12. An arrangement as claimed in claim 7, wherein the S-shaped profiles are made of stainless steel.

* * * * *